United States Patent [19]

Armstrong, et al.

[11] 4,143,404

[45] Mar. 6, 1979

[54] LAMINATED FILTER-ELECTROLUMINESCENT RECITULAR INDEX FOR CATHODE RAY DISPLAY

[75] Inventors: James B. Armstrong, Phoenix; J. Robert Trimmier, Glendale, both of Ariz.

[73] Assignee: Sperry Rand Corporation, New York, N.Y.

[21] Appl. No.: 878,860

[22] Filed: Feb. 17, 1978

[51] Int. Cl.[2] .................... H04N 5/72

[52] U.S. Cl. .................... 358/253; 313/462; 313/463; 358/252

[58] Field of Search .................... 358/250, 252, 253; 313/462, 463, 473

[56] References Cited

U.S. PATENT DOCUMENTS

| | | | |
|---|---|---|---|
| 3,496,295 | 2/1970 | Pohle | 358/250 |
| 3,946,267 | 3/1976 | Lustig | 358/252 |

*Primary Examiner*—Howard W. Britton
*Attorney, Agent, or Firm*—Howard P. Terry

[57] ABSTRACT

An optical filter possessing narrow pass band characteristics selectively absorbs impinging ambient white light components and is used in combination with a laminate graticule having transparent electrodes lying in a common plane for defining a multiplicity of electrically insulating gaps in the pattern of the graticule for exciting associated partially over-lying electroluminescent phosphor patterns. The graticule pattern being composed of an electroluminescent material, night viewing of the graticule is readily accomplished by electrically exciting it. For daylight viewing, the unexcited phosphor material is itself directly viewed.

20 Claims, 8 Drawing Figures

LAMINATED FILTER-ELECTROLUMINESCENT RECITULAR INDEX FOR CATHODE RAY DISPLAY

BACKGROUND OF THE INVENTION

1. Field of the Invention

The invention relates to cathode ray and other display devices suitable for use in high, low, and intermediate ambient light level conditions and, in particular, to a laminated combination of optical filter and electroluminescent graticule devices for operation in a wide range of ambient light levels.

2. Description of the Prior Art

Many airborne displays, as well as displays employed in ground-based air traffic control, radar, data processing, and the like systems have unusual requirements generally not fully met by conventional apparatus. A major need is to provide adequate brightness and especially good contrast when the display is viewed in high level ambient light, such as sunlight, while retaining these characteristics when viewed at very low light levels. A further major problem with such displays is connected with supplying suitably viewable fixed reference indices so that points of interest in the display can be readily located in relative position. Connected with the inherent natures of the displays themselves is the need for the lighting of the indices to be compatible over a large range of circumstances with the display brightness and with ambient light level conditions.

In aircraft cockpit instruments, several known attempts have been made to solve these problems, such as adjustable edge lighting of a transparent light guiding sheet placed in front of the display and bearing engraved markers which scatter light into the observer's eyes. This method and methods involving adjustable flood lighting of such indices fall short of acceptability, generally because they scatter considerable light unnecessarily into the cockpit, consume a substantial amount of power, and require too much space in already crowded aircraft instruments. Some attempts have been made specifically to place the needed indices on the inside surface of the cathode ray tube face plate at the location of the display phosphor. This arrangement very substantially reduces parallax between the electron beam generated scene and the index marks, but is considered to be expensive. Also, the concept lacks flexibility in that the index can not be modified once the display tube is manufactured. Further, such marks can not be readily viewed through a light-absorbing, contrast-enhancement filter applied to the external face of the display tube. Other methods, dependent upon illumination of indices by light scattered within the display, arising either from ambient light or electron-beam stimulated phosphor emission, are subject to the variability of the level, the distribution, and the angle of incidence of the light, and are not readily controlled. Accrodingly, it is an object of the invention to make the generation of light directed to the observer's eye by the display and that by the associated index device relatively independent of each other by means not characterized by the defects of the prior art.

SUMMARY OF THE INVENTION

The present invention relates to combination filter-graticule index devices through which cathode ray or other bright displays may be viewed comfortably in a wide range of ambient light conditions. A contrast enhancement optical filter is employed using a narrow wave length pass band and absorbing the major portion of white light normally scattered within the cathode ray tube phosphor and thence into the observer's eye, whether the scattered light originates within the phosphor layer or is incident upon it from without from ambient or other light. The filter is combined in a laminate graticule structure including transparent electrodes lying in a common plane and defining electrical gaps exciting, when energized, associated parts of a graticule pattern of electroluminescent phosphor material deposited in the gaps. Night viewing is readily accomplished by electrically exciting the electroluminescent phosphor at a level compatible with the level of brightness of the contrast enhanced cathode ray dispaly. For daylight viewing, the dormant electro-luminescent phosphor material is such that it is itself directly viewed normally as a graticule without electrical excitation. Thus, contrast of the display is enhanced and the operator has substantially more independent control over the brightness of the display and of its associated index.

DESCRIPTION OF THE PREFERRED EMBODIMENTS

Figure 1:
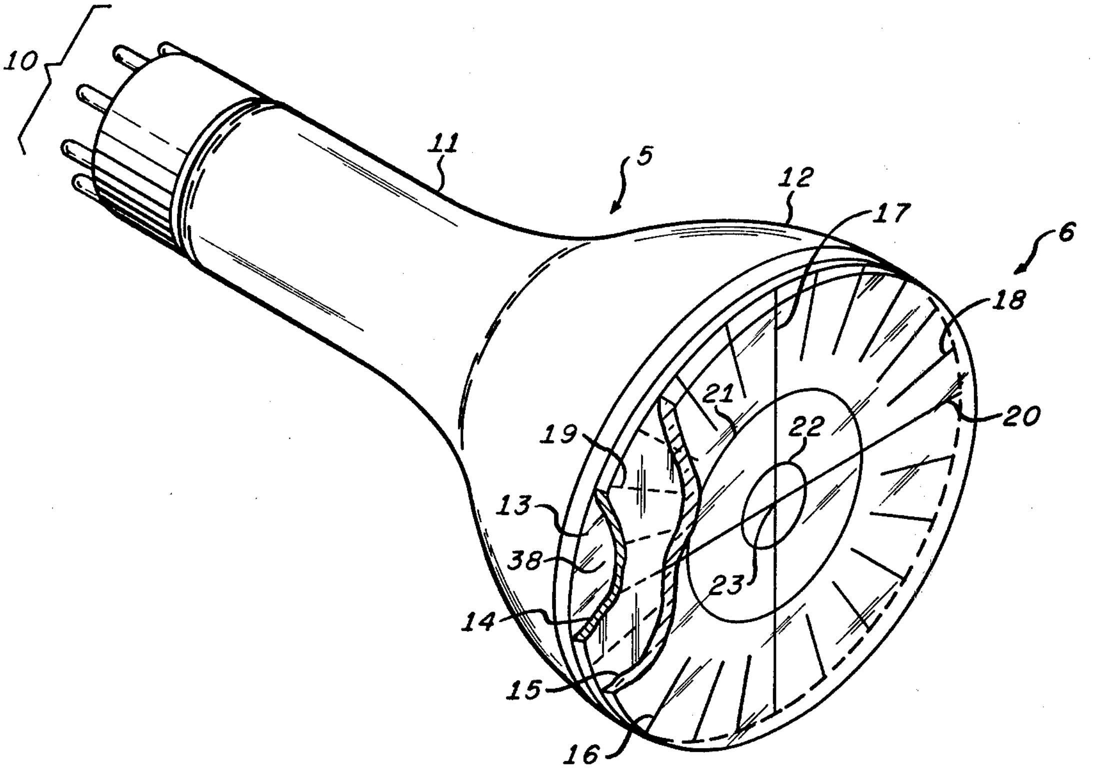
FIG. 1 is a perspective view, partly cut away, of the invention as applied in association with a representative cathode ray tube indicator.

FIG. 1 provides a view of what may be a generally conventional cathode ray display tube 5 or other bright display having the usual electrical terminals 10 projecting axially into an envelope including a cylindrical neck portion 11, a viewing face plate 13, and a conically shaped transition section 12 between the latter elements. The vacuum tube 5 additionally includes conventional interior elements (not shown) including a cathode, an anode, an intervening electron beam deflection structure, and a phosphor screen affixed to the inner surface of the viewing plate 13. For application in the present invention, face plate 13 is preferably designed to be relatively flat as is the case in a variety of available bright displays.

Figure 2:
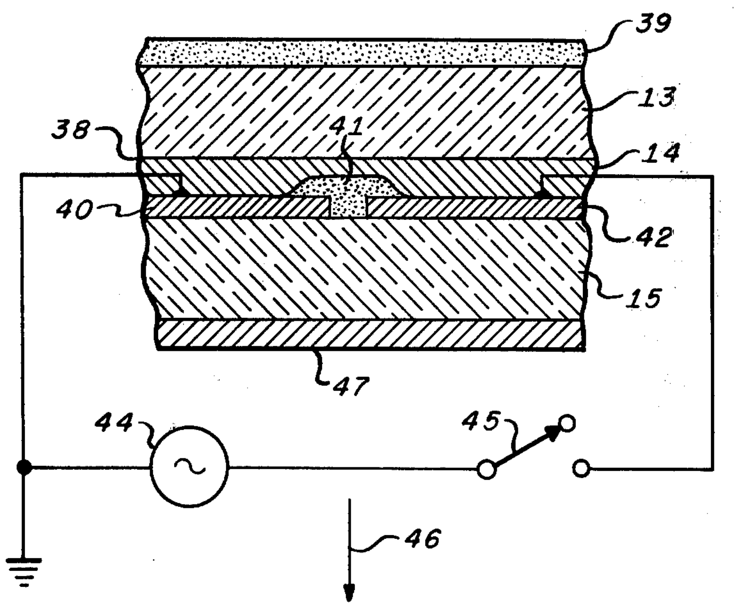
FIG. 2 is a cross section view of the frontal laminar structure illustrated in FIG. 1.

FIGS. 1 and 2 show one form of the present invention in which a laminated filter-graticule index system (14–15) is affixed to the outside surface of the envelope face plate 13. The objective of the invention is to present clearly to the viewer a useful graticule image with minimum parallax, useable under a wide range of ambient lighting conditions, while still permitting an undisturbed view of images formed by the electron beam on the cathode ray phosphor screen within face plate 13.

It will be understood that a wide range of graticule patterns may be employed in the present invention depending upon the application, such as those adapted for use in terminal air traffic control, radar, data processing, and the like systems. However, the invention will be explained herein as applied as a novel index system for a radar display in an aircraft cockpit.

FIG. 1 illustrates the locations of the various markers or index lines which make up the bore sight type of graticule of the display in a preferred form of the invention. Each such line is located in a single plane lying essentially between the inner surface of graticule index plate 15 and the outer surface 38 of the cathode ray tube viewing plate 13 and therefore close to the cathode ray tube face 13 so as to minimize parallax. As seen in FIG. 1, the index lines include concentric circular lines for estimation of the radial deviation of an electron-beam excited display on the cathode ray screen from the center 23 of index plate 15, such as circular lines 21 and 22, as well as a plurality of radially disposed lines. The normally horizontal diametral line 20 and the normally vertical diametral line 17 serve to provide principal angular reference indices by defining four similar angular quadrants. A finer estimate of location of cathode ray tube images in each such quadrant is afforded by the several radial lines arranged about the periphery of index plate 15 within each quadrant, such as the typical radial index lines 16 and 18. The similar short radial dotted line 19 indicates the position in which a line analogous to line 16 or line 18 would lie except for the removal in the drawing of a portion of index plate 15 in the vicinity of line 19. As previously indicated, it is desired that lines 16 through 22 be visible under a wide range of ambient lighting conditions and be as close to the face 38 of cathode ray tube 5 as possible to minimize parallax.

The light emitted by the cathode ray tube phosphor 39, as is typical of the P-43 type of phosphor used in the described preferred embodiment, is selected for its relatively confined emission spectrum having the majority of its energy concentrated in the green and yellow portions of the optical spectrum. Accordingly, it is filtered in a particular manner by an absorbing or contrast enhancement filter formed preferably as a selective light absorbing adhesive layer 14 contained between the cathode ray tube face plate 13 and the graticule structure 15 with no air gaps or voids. It is desirable that the materials of the cathode ray tube face plate 13, graticule substrate 15, and the adhesive filter layer 14 bonding them together have substantially the same index of refraction, thus eliminating undesirable reflections due to index mismatches at the several associated interfaces. Further, the transparent electrically conductive layers 40 and 42, yet to be discussed, do not in general possess an optical index of refraction matching the adjoining layers. Consequently, layers 40, 42 are applied at a half-wave optical thickness of approximately 555 nanometers, a thickness corresponding to the peak of the color response of the eye in order to minimize the visible reflection in accordance with well known optical principles.

Figure 7:
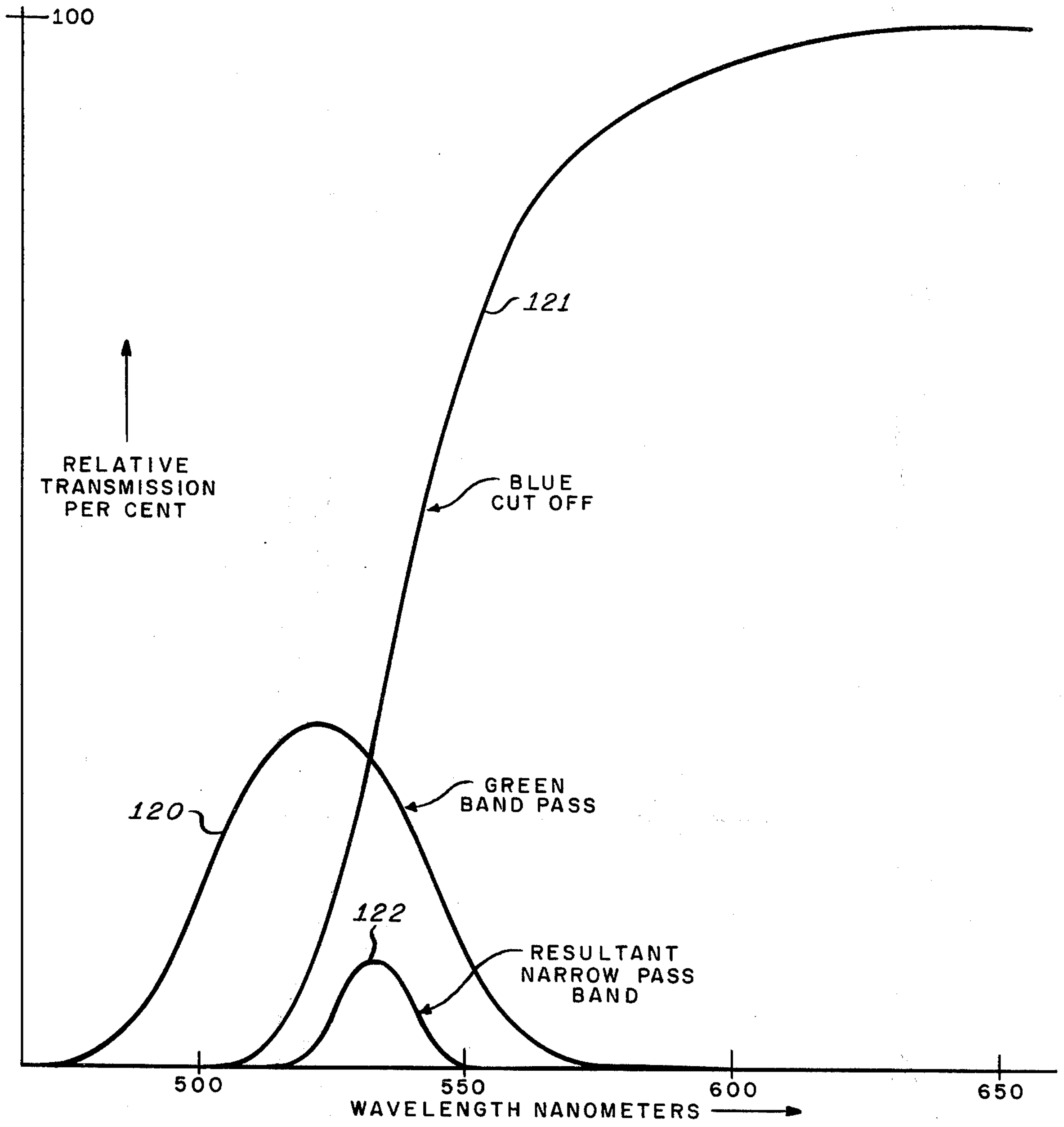
FIG. 7 is a graph useful in explaining the operation of the invention.

The absorbing or contrast enhancement filter 14 may be generated in an essentially conventional manner by the dispersion of two absorbing dyes, a yellow dye and a green dye, within a transparent polymerizable gel following substantially conventional practice. As seen in FIG. 7, the green dye may form the main pass band 120, attenuating light having wave lengths above and below its center wave length. The representative yellow dye cuts off a further portion of the blue region of the spectrum and some of the green, as well, as at 121. In practice, the green dye concentration roughly sets the center wave length of the pass band. The yellow dye concentration is adjusted in relation to the green concentration more accurately to position the filter pass band 122 about the phosphor emission maximum. The total concentration of the two properly proportioned dyes is varied to provide the desired level of the pass band transmission. Suitable dispersal media for the green and yellow dyes are readily available on the market, including a clear room-temperature curing polymer known as Eccogel 1265, manufactured by Emerson-Cuming, located at Camton, Mass. Other transparent media, including certain silicone materials, are also known in the art to be suitable for this purpose and methods of employing them are also well understood and therefore need not be further discussed herein.

A variety of optical filters and filter combinations are known in the prior art that are suitable for present purposes, including the concepts of the C. D. Lustig et al. U.S. Pat. No. 3,946,267 for a "Plural Filter System Cooperating With Cathode Ray Display with Lanthanum Host Phosphor Emissive in Two Colors," issued Mar. 23, 1976 and assigned to Sperry Rand Corporation. While proposed for use in application with a penetration type of cathode ray tube, the filters described by Lustig et al. for enhancing green light transmission find application with conventional types of cathode ray tubes of the kind used herein. On the other hand, the present invention may, in fact, also be used with penetration phosphor cathode ray tubes such as that described by Lustig et al.

One of the fundamental factors that have a significant bearing on seeing a cathode ray generated image in contrast. Brightness is generally important, but the present invention aids the viewer also by providing a sharply contrasting color image with respect to normal ambient light because of the selected spectral line used to generate that image. Improved brightness contrast is obtained in the present invention because ambient white light striking the front of the cathode ray tube viewing plate 13 generally contains visible light over the whole wave length range from 450 to 650 nanometers. As this ambient light passes inwardly through filter 14, the wave length components outside of the resultant pass band 122 are strongly attenuated. The transmitted, attenuated ambient light is reflected and scattered off the cathode ray tube phosphor and, before reaching the eye, passes once more through filter 14 and is further beneficially attenuated. The double attenuation results in a greatly reduced intensity of scattered ambient light reaching the eye. At the same time, the green light produced by electron beam excitation of the phosphor corresponding to component 122 passed by filter 14 flows relatively less unattenuated through filter 14 toward the viewer's eye. That portion of the ambient light twice passed through the filter material, scattered, and returned to the eye relatively unattenuated constitutes a small portion of the energy normally contained in a wide variety of ambient lighting conditions encountered and may be made negligible with respect to readily achievable cathode ray tube brightnesses. Accordingly, contrast is greatly improved.

Because absorption filter 14 of necessity has a finite thickness, a spot of light produced by electron beam excitation at the cathode ray tube face plate 13 is transmitted at its greatest intensity in the direction normal to the plane of filter 14. Rapidly increasing attenuation is encountered for any light emerging from filter 14 at increasing angles with respect to that normal. Accordingly, any feature placed on the viewing side of filter 14 which will receive any significant illumination from the excited cathode ray tube phosphor will be only any such feature which by coincidence happens to lie substantially superimposed upon an electron-beam illuminated spot on the cathode ray face plate 13. As a consequence there is, in effect, no scattered or stray light originated by the cathode ray beam that would inherently illuminate any feature lying on the viewing side of filter 14, such as fixed graticular index lines.

The graticule portion 15 of the present invention is designed to operate in a novel manner in cooperation with the aforementioned filter system. In accordance with the present invention, the graticule device comprises a powdered electroluminescent phosphor, wherein the light body color of the unexcited phosphor itself serves effectively the same function in forming viewable index lines as would the pigment of a paint normally used in high levels of ambient cockpit brightness. The phosphor powder then serves inactively simply to provide a diffuse reflecting surface pattern when the cockpit is well lighted, reflecting such light into the eyes of the observer. On the other hand, when the cockpit is dark, the electroluminescent phosphor material is electrically energized by the operator to provide a self-luminous reticule pattern.

In FIG. 2, it is seen that the graticule index consists of a transparent parallel-sided insulating plate 15 which may be made of a glass or other material closely matching the index of refraction of the filter components so as to avoid reflection from the several respective interfaces. Its front or exterior face closest to the eyes of the observer is coated with a conventional anti-reflection surface layer 47 of any of the types widely discussed in the literature. On the rear surface of plate 15, there are formed very thin coplanar transparent electrodes, such as electrodes 40, 42, which define electrical gaps therebetween. The gap may take the form of an extended line by extending electrodes 40, 42 in the general direction perpendicular to the plane of the drawing. Between electrodes 40, 42 and within the associated gap is placed an electroluminescent phosphor pattern 41, the graticular index assembly being affixed permanently to the face 13 of the cathode ray tube by means of a suitable light absorbing medium at 14; i.e., the filter combination itself. Leads coupled to electrodes 40, 42 place an electric field across the gap between electrodes 40, 42 when switch 45 is closed to connect voltage source 44, which may be an alternating or unidirectional voltage source, across the gap thus electrically exciting phosphor 41. The driving voltage required is highly dependent upon the dielectric constant of the binder for the electroluminescent phosphor, the specific phosphor used, the interelectrode gap, and the brightness required. One configuration produces 1.5 foot lamberts for 800 volts applied across a 0.005 inch gap when using a zinc sulfide phosphor. Narrowing the insulating gap substantially reduces the voltage required to produce a given brightness. Electrodes 40, 42, as well as elements 15 and 47, being transparent, light flows from the phoshor toward the viewer in the sense of arrow 46 and forms an index pattern in the viewer's eye.

The transparent electrodes 40 and 42 are formed conventionally by vacuum depositing tin oxide or other transparent coating material having a sheet resistance of the order of 200 ohms per square inch. Other transparent materials such as gold or silver may be employed using well known methods. A preferred material is an alloy of about 90 percent indium oxide and 10 percent tin oxide.

The electroluminescent phosphor 41 may be selected from available widely used materials and may be applied using generally conventional methods, such as by screen printing. One successful phosphor powder consists of a copper and manganese activated zinc sulfide phosphor sold by Sylvania as the phosphor type 523. Similar phosphor particles using a barrier coating, such as silica or another high dielectric material, or hyper maintenance phosphors may be employed.

Figure 3:
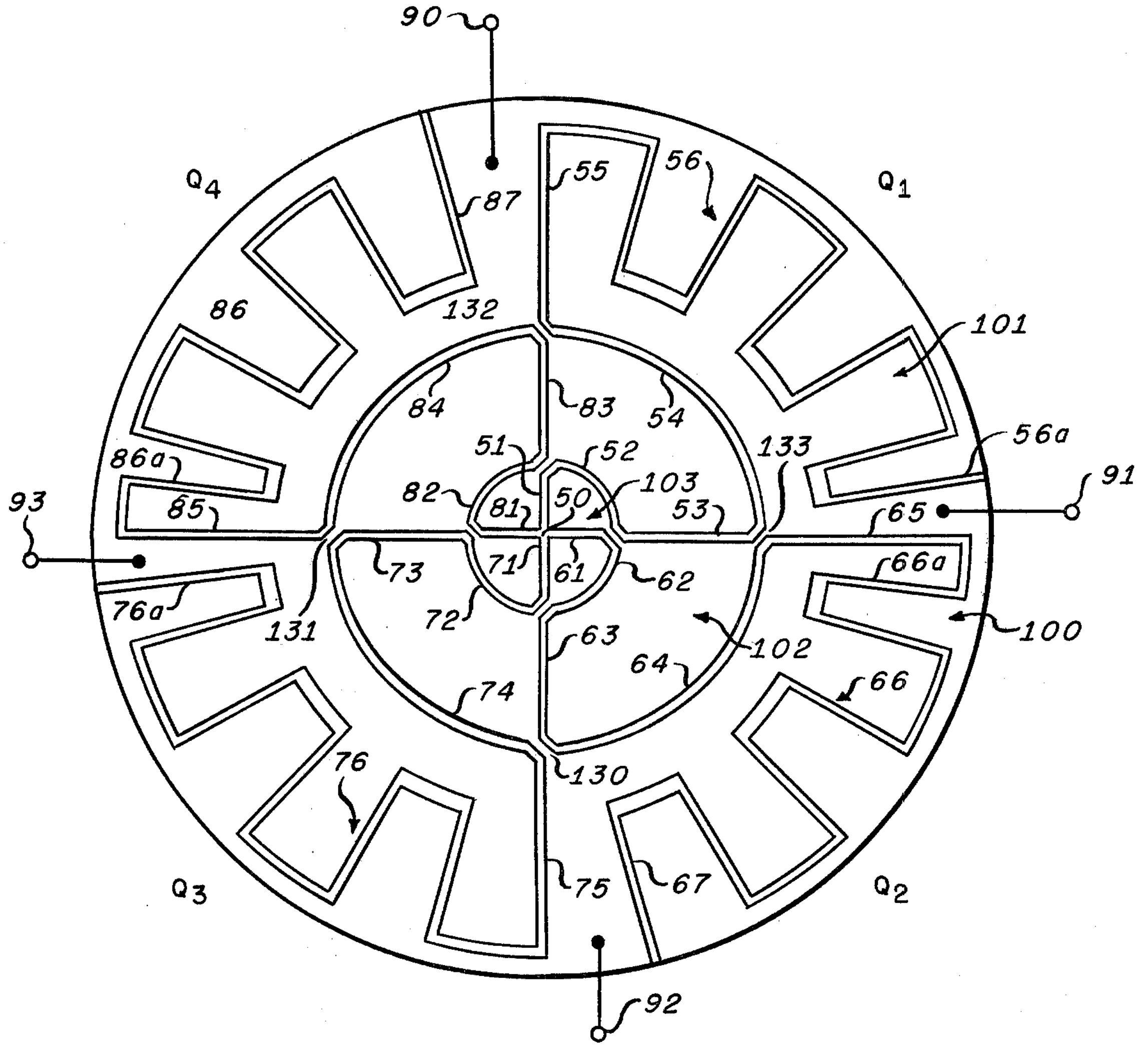
FIG. 3 is a view of the face of the partly completed graticule structure of FIGS. 1 and 2.
Figure 4:
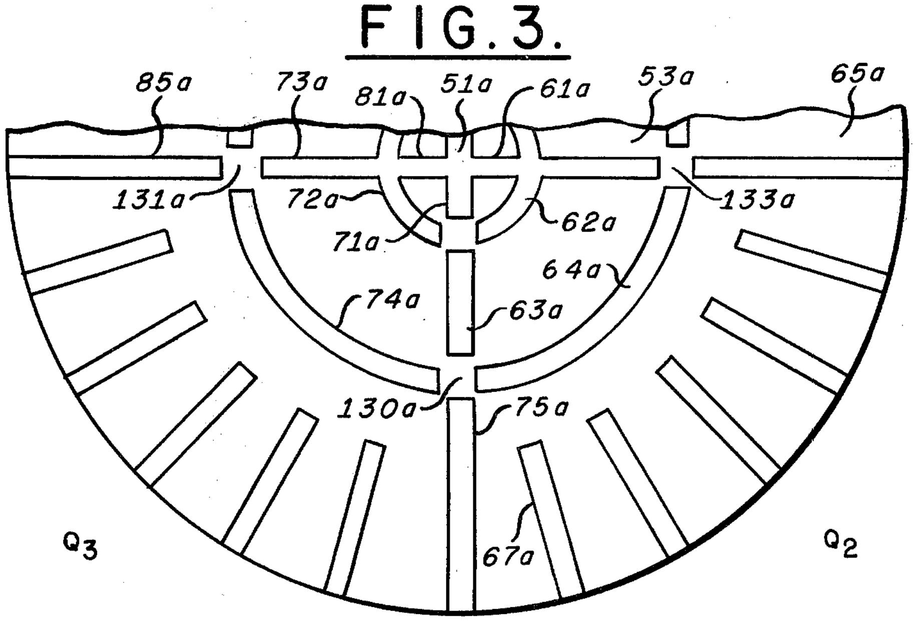
FIG. 4 is a view of the face of the graticule structure of FIG. 3 at a further point in its fabrication.

FIGS. 3 and 4 indicate details of the structure of a typical graticule configuration. FIG. 3 shows a structure which is first in the form of the glass substrate 15 and is then coated using a conventional process with the electrically conducting electrode material (tin oxide, for example). Such coated glass may also be directly purchased on the market. A complex matrix of insulating lines is then formed to isolate electrically various parts of the pattern, such as by painting on an acid resistant pattern by conventional screen print graphic process, followed by an acid etch selectively to remove conductor material. If the insulating breaks are to be smaller than 0.005 inches across, a conventional photoresist process may be employed, again after which narrow gap lines are etched entirely through the transparent conductive layer using a standard hydrochloric acid-zinc powder process.

With the completion of the etching step, the pattern of continuous insulating gaps of FIG. 3 is produced having four separate groups of electrode pairs in quadrants $Q_1$, $Q_2$, $Q_3$, and $Q_4$. For example, one of the four insulating gaps, starting at the center 50 of the pattern, takes the following course: radial 51 between quadrants $Q_4$ and $Q_1$; arc 52 in quadrant $Q_1$; radial 53 between quadrants $Q_1$ and $Q_2$; arc 54 in quadrant $Q_1$; radial 55 between quadrants $Q_4$ and $Q_1$; and meander 56 in quadrant $Q_1$. It is thus seen that this continuous insulation line may be associated for purposes of identification with quadrant $Q_1$, though it obviously provides insulation with respect to electrode parts found in the contiguous quadrants $Q_4$ and $Q_2$. Continuous insulating line patterns of similar nature may also be similarly described with respect to the remaining quadrants $Q_2$, $Q_3$, and $Q_4$. When the continuous insulating line gaps of the remaining quadrants are traced in FIG. 3, it will be found that a total of four groups of electrically isolated electrode pair patterns are defined by them. For example, cooperating parts of each of the electrode systems now lie in contiguous quadrant pairs. In the case of the excitation point 91, for instance, that terminal is connected to an outer arcuate electrode part 100 lying along the outer periphery of quadrant $Q_2$, a next inner arcuate part 101 lying in quadrant $Q_1$, a further inner arcuate part 102 lying in quadrant $Q_2$, and a final innermost arcuate part 103 lying in quadrant $Q_1$. Other similar electrode patterns, alternately disposed in contiguous quadrant pairs, are found connected to the respective terminals 92, 93 and 90 and correspond to conductors 40 and 42 of FIGS. 2 and 5. The matrix of four electrode elements thus formed is characterized by the fact that, if the same electrical potential is applied to terminals 91 and 93 and the opposite potential to terminals 90 and 92, there will everywhere in the electrode pattern be found a uniform electrical field of the same magnitude across all of the radial and arcuate parts of a given gap width in the four continuous line gaps. In this manner, it is seen that a planar matrix of electric fields is produced including two circularly concentric patterns, a horizontally disposed pattern, a vertically disposed pattern, and a plurality of short peripheral radial patterns. The planar matrix of electric field gaps determines the location of the electroluminescent material in such a manner as to produce the index pattern of FIG. 1, whether or not electrical excitation is applied.

For this purpose, electroluminescent material is applied as at 41 in FIG. 2 in selected parts of the gaps between electrodes 40, 42. The phosphor reticle pattern may be deposited to a depth of about 0.010 inches in careful registry with the etched electrode gap pattern by a conventional screen-printing process, for example. A suitable binder such as lacquer may be used to suspend the phosphor particles for application by the silk-screen process, for example.

The phosphor deposition step, as seen by comparing FIGS. 3 and 4, yields a horizontal phosphor line index made up of parts 85*a*, 73*a*, 81*a*, 61*a*, 53*a*, and 65*a* overlying the respective electrode gap segments 85, 73, 81, 61, 53, and 65. Similarly, the vertical phosphor line index is made up of parts such as parts 75*a*, 63*a*, 71*a*, 51*a* and (not shown) 83*a* and 55*a* overlying the respective gap segments 75, 63, 71, 51, 83, and 55. The inner phosphor circular index is made up of parts 52*a*, 62*a*, 72*a*, and 82*a* overlying the respective arcuate electrode gap segments 52, 62, 72, and 82. The outer concentric phosphor circular index is similarly made up of parts 54*a*, 64*a*, 74*a*, and 84*a* overlying the respective electrode gap segments 54, 64, 74, and 84. In quadrant $Q_1$, the series of five equally spaced radially extending gaps in meander 56 (excluding gap 56*a*) is coated with phosphor material to generate indices such as the radial index 18 of FIG. 1. Similarly, five equally spaced radial gaps in meander 66 are coated to form indices in quadrant $Q_2$ such as the radial index line 67*a*. The generation of equally spaced radial electric field gaps in quadrants $Q_3$ and $Q_4$ is similarly undertaken. Where no index is to be provided, as at the irregularly located gaps 56*a*, 66*a*, 76*a*, and 86*a* which must be provided to complete electrode isolation, no phosphor is deposited. Phosphor is likewise not deposited at areas 130*a*, 131*a*, 132*a*, and 133*a* overlying regions 130, 131, 132, and 133 in order to avoid the visual distraction of two small parallel diagonal lines in this area of the reticule pattern.

Figure 5:
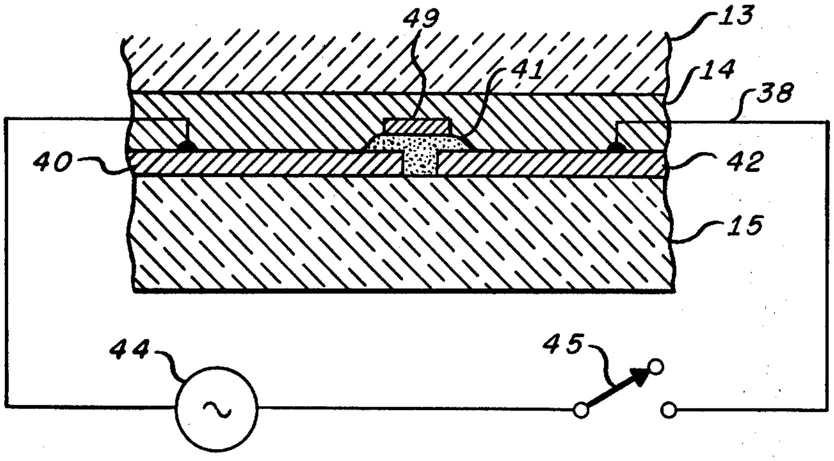
FIG. 5 is a view of a modification of the cross section view shown in FIG. 2.

In the alternative form of the invention shown in FIG. 5, a thin, not necessarily transparent conductive strip 49, is placed on top of the electroluminescent phosphor line 41 by a conventional method, as by vacuum deposition through a suitable mask, the strip 49 having a thickness of 500 nanometers, for example. In this instance, source 44 will supply a voltage across the gap occupied by phosphor 41 between electrodes 40, 42. Strip 49 is simply allowed to float electrically as it readily accomplishes its purpose in this manner and would, indeed, be somewhat difficult to ground. Electrode 49 acts beneficially to spread the electric field over a greater volume of the electroluminescent material so that it excites substantially more light from the electroluminescent phosphor 41.

Figure 6:
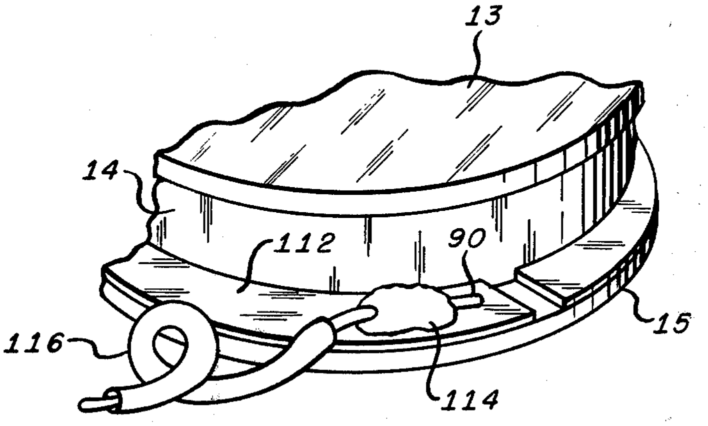
FIG. 6 is a perspective view of a fragmentary portion of FIG. 1.

FIG. 6 is largely self-explanatory, illustrating the fragments of cathode ray tube face 13, the contrast enhancement filter 14, and the graticule 15, but more particularly suggesting a structure for the electrical connectors 90, 91, 92, 93 of FIG. 3. The electrical conductor 90 of the insulated lead 116 may conveniently be ohmically coupled to the transparent electrode 112 (corresponding to electrode 101 of FIG. 3) by an electrically conducting adhesive bond 114. The latter may be formed by any commercially available conductive epoxy material commonly used for the purpose. Other conventional methods of making the connections are well known in the art.

Figure 8:
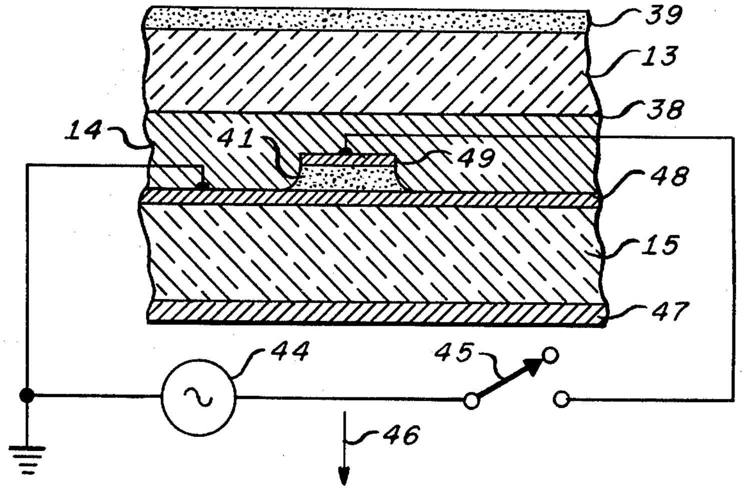
FIG. 8 is a cross section view of a further modification of the invention.

A further modification of the present invention is illustrated in FIG. 8. In the configuration, the graticule plate 15 has a continuous transparent electrode 48 deposited over its entire surface and the electroluminescent phosphor 41 is deposited on this electrode in the desired graticule pattern as previously described. Over this pattern is deposited a continuous strip 49 in the same general pattern, but preferably substantially narrower in width than strip 49 of FIG. 5. Actually, strip 49 may simply be a fine wire conforming to the electroluminescent powder pattern 41. Electrical connections are simplified since one terminal from electrical source 44 and series switch 45 is simply connected directly to transparent electrode 48 and the other to the conductive grid including conductor 49. Closure of switch 45 places a voltage across phosphor layer 41, thereby illuminating the same for night or dark cockpit conditions. By grounding continuous electrode 48, electromagnetic interference is substantially eliminated.

It will readily be recognized by those skilled in the art that the dimensions and proportions used in the drawings are not necessarily those which would be used in practice, and that proportions have been distorted in the drawings for the purpose of clearly illustrating the invention and because some of the films illustrated, for instance, in FIGS. 2 and 5 as having considerable thickness are in fact nearly vanishingly thin. The widths of the electrical gaps and electroluminescent lines in FIGS. 3 and 4 are generally to be adjusted at the will of the designer so that the phosphor patterns appear to the viewer to be made up of relatively narrow lines. Their actual widths will be determined in part by the operating distance between the cathode ray tube face 13 and the eyes of the viewer. It will also be understood that the preferred order of construction is first to make the graticule 15, then to affix the graticule structure to the cathode ray tube face 13 at a predetermined spacing, utilizing the formulated selective color absorbing adhesive, thus forming the contrast enhancement filter.

Accordingly, it is seen that the invention provides a filter-graticule device through which a bright display may be viewed comfortably under a wide range of ambient light conditions. Night viewing is readily accomplished by electrically exciting a pattern of electroluminescent phosphor lines at a level compatible with the brightness level of the display after it is filtered by a relatively narrow pass band filter. For daylight viewing, the electrically unexcited phosphor pattern itself is directly viewed. Thus, contrast is enhanced and the viewer has significantly improved independent control over the relative brightnesses of the display and of its associated graticule index by means not characterized by the defects of prior art systems. It will be understood that references herein to graticules, reticules, and the like are intended to be interpreted in the broad sense to include devices having matrices of index lines, lineal as well as curvate, placed on a substrate for viewing by an observer, but not necessarily residing between elements of an optical instrument.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Bright image display apparatus of the cathode ray tube kind having a viewing face with a predetermined spectral emission characteristic when energized comprising:

contrast enhancement filter means on said viewing face having an optical band pass related to said predetermined spectral emission characteristic for absorbing scattered light emissions from said viewing face and rendering said image readily visible under high and low ambient light conditions, graticule index means associated with said filter means comprising first and second electrode means, at least one of said electrode means being transparent and at least one of said electrode means forming narrow gap means with the other electrode means, said gap having a predetermined generally lineal graticule pattern, electroluminescent means disposed within said gap means, said electroluminescent means having a reflectance characteristic rendering it visible by reflected light under high ambient light conditions, and means for applying a voltage between said transparent electrode means for exciting said electroluminescent means and rendering said graticule pattern visible under low ambient light conditions.

2. Display apparatus as set forth in claim 1 wherein said graticule index means comprises a glass plate having said first and second electrode means and said electroluminescent means deposited on one face thereof and bonding means for bonding said glass plate to said display viewing face.

3. Display apparatus as set forth in claim 2 wherein said contrast enhancement filter means comprises a mixture of dyes incorporated in said bonding means.

4. Display apparatus as set forth in claim 2 wherein said one face of said glass plate having said electrode means and said electroluminescent means thereon constitutes the bonding face for said bonding means whereby to protect said electrode means and said electroluminescent means from the external environment of said display apparatus.

5. Display apparatus as set forth in claim 4 wherein the exposed face of said glass plate includes an anti-reflection coating.

6. Display apparatus as set forth in claim 2 wherein said first and second electrodes are both transparent and coplanar and wherein said narrow gap means is formed therebetween.

7. Display apparatus as set forth in claim 6 wherein said gap means formed by said first and second coplanar transparent electrode means comprises a plurality of continuous, non-intersecting segments, whereby said electrode means may be separately excited to produce a voltage across said electroluminescent means within said gap means.

8. Display apparatus as set forth in claim 7 further including conductor means bonded to said first and second transparent electrode means, a source of electrical current, and switch means for connecting said alternating current source to said first and second conductor means.

9. Display apparatus as set forth in claim 6 wherein said transparent graticule index means comprises a glass plate having a plurality of groups of said gaps, each group forming first and second transparent electrode means, electroluminescent means arranged on said glass plate in said predetermined pattern of continuous intersecting segments, corresponding groups of first and second conductors bonded respectively to each of said first and second transparent electrode means, a source of alternating current, and switch means for connecting said respective groups of first and second conductors with said alternating current source.

10. Display apparatus as set forth in claim 2 wherein said first electrode means comprises a transparent electrode deposited uniformally on said glass plate, wherein said electroluminescent means is deposited on said first electrode means in said predetermined graticule pattern, and wherein said second electrode means is deposited on said electroluminescent means.

11. Display apparatus as set forth in claim 10 further including conductor means connected to said first and second electrode means, a source of energizing current, and switch means for connecting said source to said first and second conductor means.

12. Bright image display apparatus having a viewing face and a predetermined optical emission spectrum comprising:

contrast enhancement filter means disposed on said viewing face for transmitting a predetermined portion of said optical emission spectrum and for absorbing scattered light lying outside of said portion, transparent graticular index means disposed on said contrast enhancement filter means at a common interface, at least first and second transparent electrode means disposed at said common interface on said transparent graticular index means for forming lineal gap means therebetween, and electroluminescent means disposed within said lineal gap means thereby forming lineal index means, said lineal index means being adapted to selective viewing by application of a voltage between said first and second transparent electrode means for viewing said electroluminescent means in electrically excited state or by removal of said voltage for direct viewing of said electroluminescent means by ambient light reflected therefrom.

13. Apparatus as described in claim 12 further including an anti-reflection layer affixed to said transparent graticular index means opposite said common interface.

14. Apparatus as described in claim 12 wherein said portion of said optical emission spectrum lies in the green spectrum.

15. Apparatus as described in claim 12 wherein said electroluminescent means comprises of a copper and manganese activated zinc sulfide phosphor.

16. Apparatus as described in claim 15 wherein said transparent electrode means consists of an electrically conductive metallic oxide.

17. Apparatus as described in claim 12 wherein said contrast enhancement filter means comprises a layer of transparent material inherently adhering to said viewing face and acting as a medium for dye particles dispersed therein.

18. Apparatus as described in claim 12 wherein:

said transparent graticular index means has a substantially circular periphery, and said first and second transparent electrode means define lineal gap means extending therebetween from the center of said transparent graticular index means generally outward through said circular periphery.

19. Apparatus as described in claim 18 wherein a plurality of said transparent electrode means including said first and second transparent electrode means defines an equal plurality of lineal gap means each extending, in common, from the center of said transparent graticular index means generally outward to equally spaced angular positions on said circular periphery.

20. Apparatus as described in claim 19 wherein each of said plurality of said lineal gap means is formed by a respective continuous series including:

first radial gap means,
first arcuate gap means,
second radial gap means,
second arcuate gap means, and
meandering gap means extending through said circular periphery and having plural arcuate and radial gap portions.

* * * * *